United States Patent [19]

Bunn et al.

[11] Patent Number: 5,025,939
[45] Date of Patent: Jun. 25, 1991

[54] COFFEE DECANTER WITH INTEGRAL HANDLE

[75] Inventors: Arthur H. Bunn, Springfield; Frank J. Lang, Lemont, both of Ill.

[73] Assignee: Bunn-O-Matic Corporation, Springfield, Ill.

[21] Appl. No.: 449,432

[22] Filed: Dec. 11, 1989

Related U.S. Application Data

[63] Continuation of Ser. No. 245,779, Sep. 16, 1988, abandoned.

[51] Int. Cl.$^5$ ....................... B65D 25/28; B65D 25/40
[52] U.S. Cl. ............................... 215/100 A; 220/94 A; 220/855 P; 220/4.21; 222/475.1; 222/566
[58] Field of Search ................... 215/1 C, 1 R, 100 A; 220/4 A, 4 R, , 855 P, 94 R, 94 A; 222/465.1, 475.1, 566, 572

[56] References Cited

U.S. PATENT DOCUMENTS

| D. 137,943 | 5/1944 | Schlumbohm | 215/1 R |
|---|---|---|---|
| 420,916 | 2/1890 | McIntire | 220/94 R |
| 434,423 | 8/1890 | Burrows | 215/1 R |
| 1,820,406 | 8/1931 | Thompson | 220/855 P |
| 2,305,492 | 12/1942 | Poglein | 220/94 R X |
| 2,378,867 | 6/1945 | Reichart | 220/94 R |
| 2,424,045 | 7/1947 | Millstein | 215/1 R |
| 2,610,081 | 9/1952 | Bushman | 215/100 A |
| 2,677,947 | 5/1954 | Van Guilder | 220/94 R |
| 2,757,034 | 7/1956 | Puhl | 220/94 R X |
| 2,831,594 | 4/1958 | Sterges | 215/1 R |
| 2,950,032 | 8/1960 | Willis et al. | 220/94 R X |
| 3,021,026 | 2/1962 | Clare | 215/100 A |
| 3,309,000 | 3/1967 | Haverstick | 220/4 A |
| 3,504,816 | 8/1968 | Weichsel | 220/4 R |
| 4,090,648 | 5/1978 | Roberts | 222/475.1 |
| 4,251,004 | 2/1981 | Sun | 220/4 A |
| 4,867,349 | 9/1989 | Stone | 222/465.1 |

FOREIGN PATENT DOCUMENTS

| 1147167 | 4/1963 | Fed. Rep. of Germany | 220/94 |
|---|---|---|---|
| 803645 | 7/1936 | France | 222/572 |
| 181258 | 6/1922 | United Kingdom | 220/94 R |

Primary Examiner—Stephen P. Garbe
Assistant Examiner—S. Castellano
Attorney, Agent, or Firm—Richard Bushnell

[57] ABSTRACT

A decanter or carafe for serving hot coffee having a metal bottom to which a plastic upper portion is joined. The decanter is unbreakable and shatterproof for all practical purposes. The lip of the pouring spout is shaped to facilitate pouring to either side as well as frontwards. A pistol grip handle skeleton is integrally joined to the plastic upper portion and receives mating grip pieces from opposite sides. The mating grip pieces may be colored brown to designate "regular" coffee and orange to designate "de-caffinated" coffee. The composite handle incorporates vents to drain liquid that might otherwise become trapped therein.

9 Claims, 4 Drawing Sheets

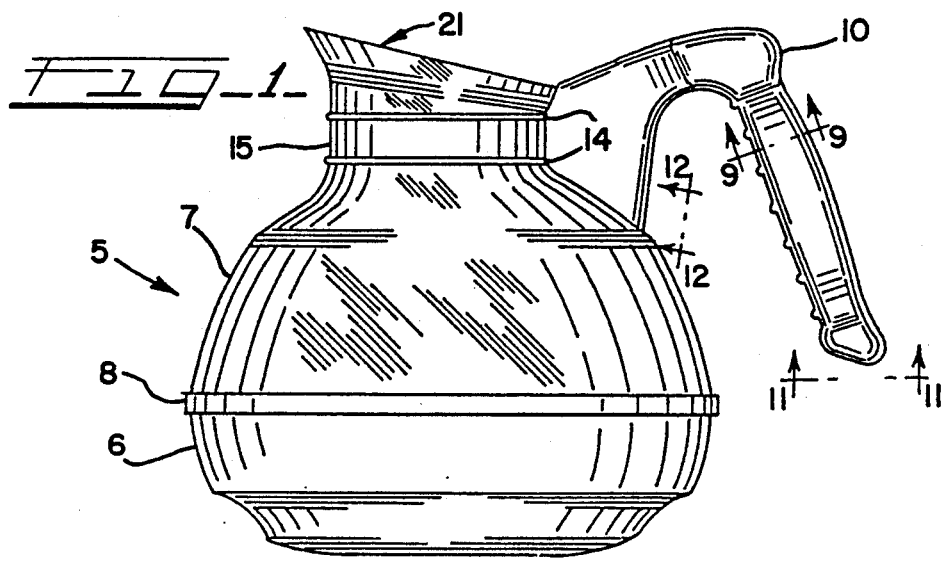
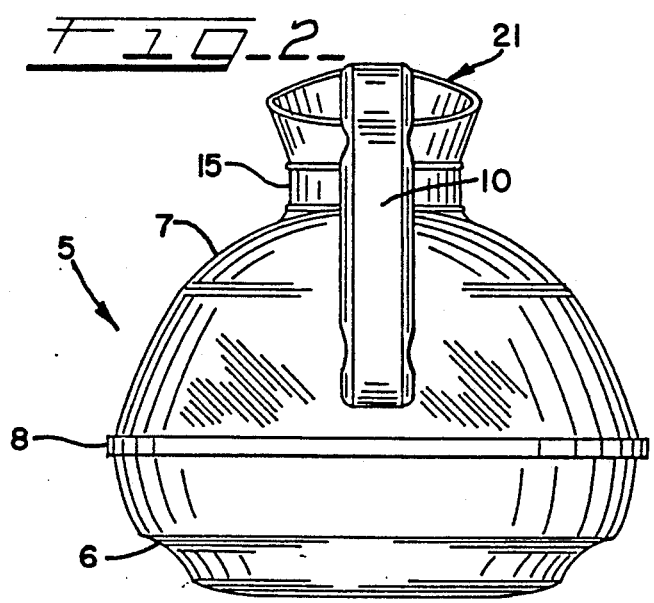
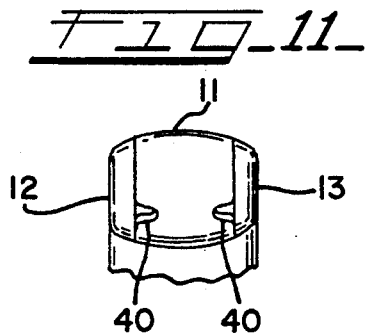
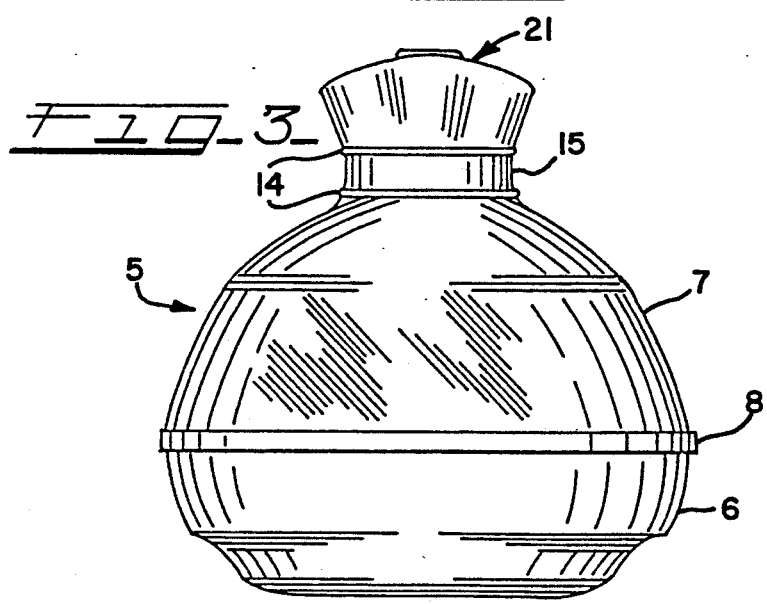
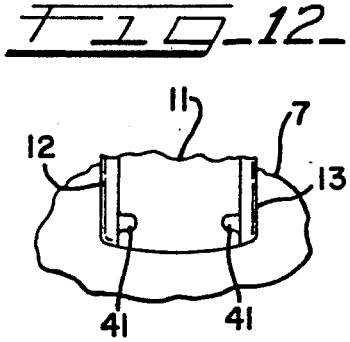

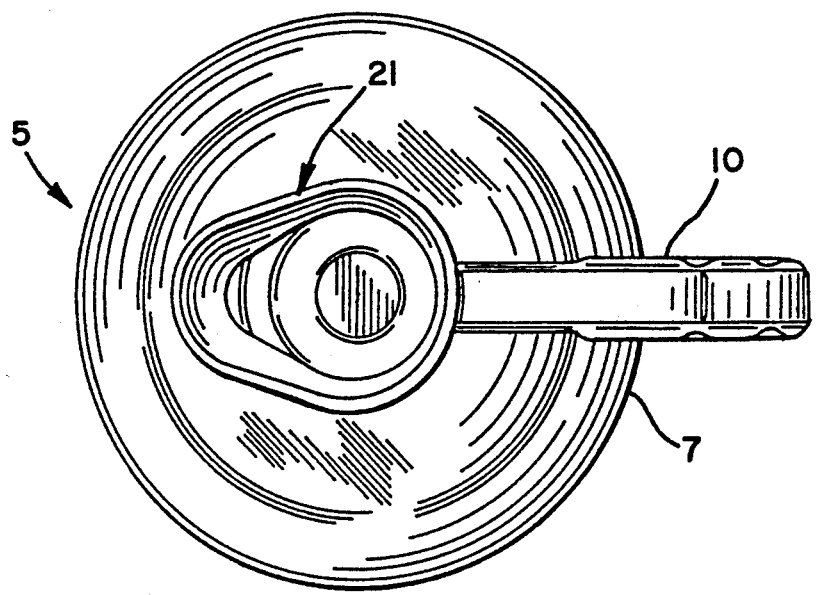
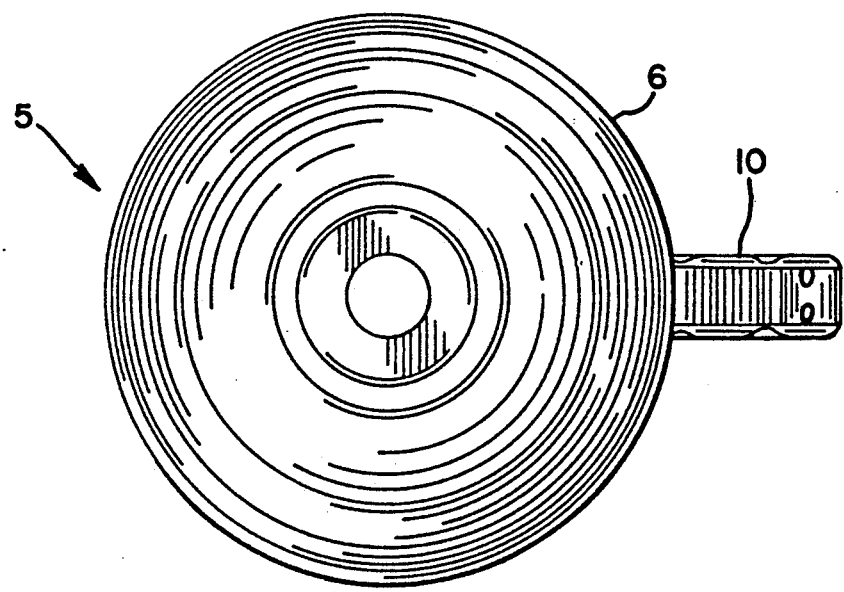

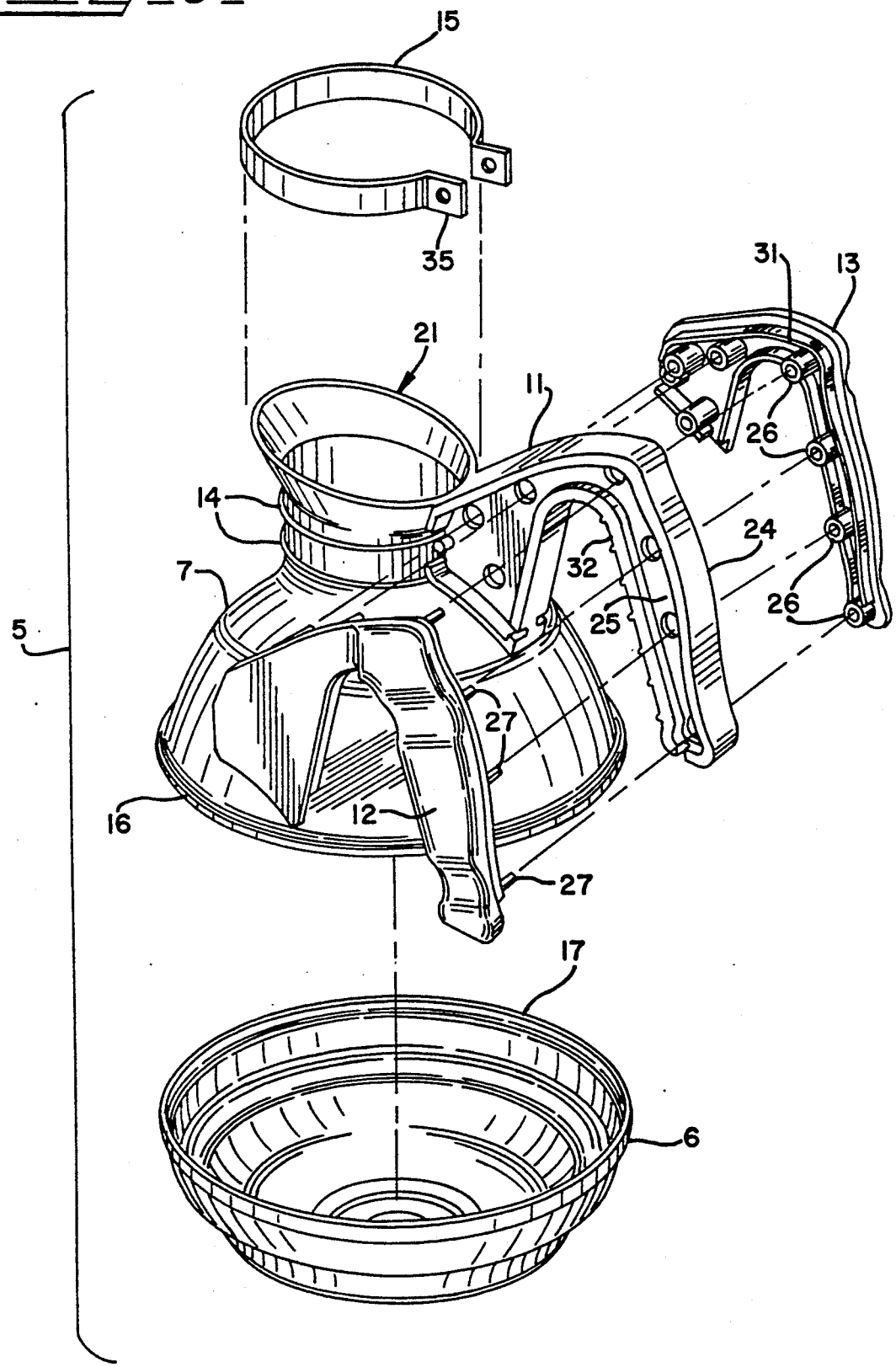
FIG_6_

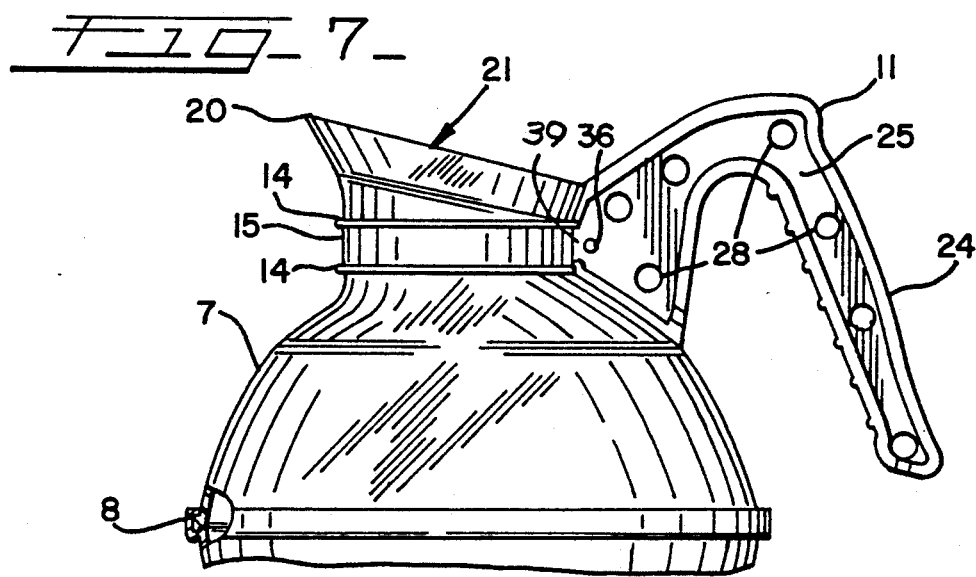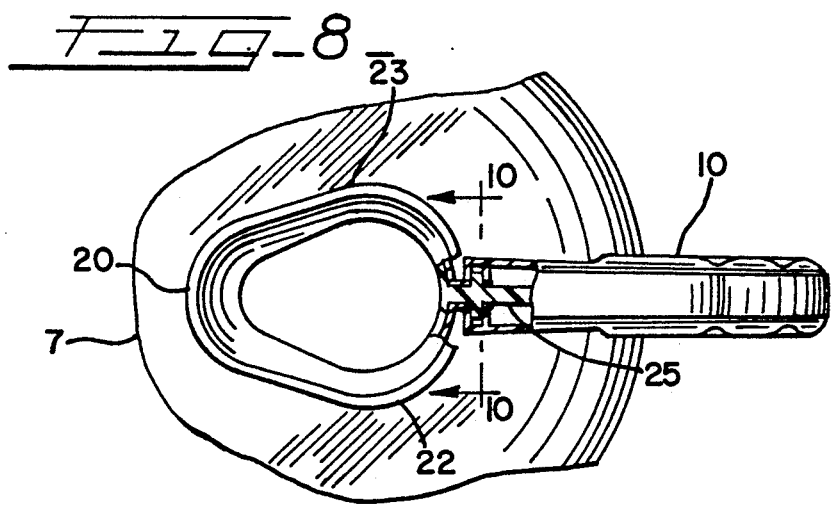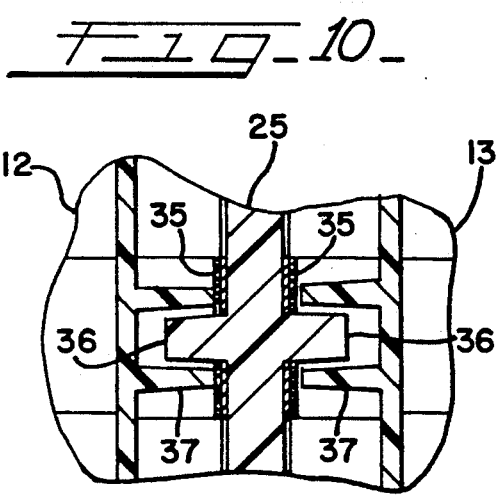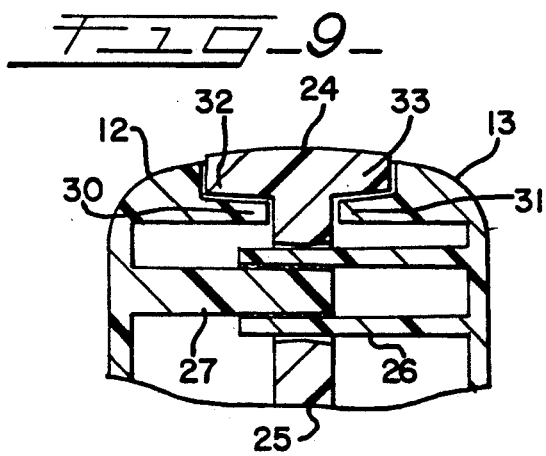

COFFEE DECANTER WITH INTEGRAL HANDLE

This application is a continuation of Ser. No. 07/245,779 filed on Sept. 16, 1988 and now abandoned.

This invention relates generally to innovations in decanters or carafes for serving hot coffee, tea, water and other beverages. The invention relates in particular to the configuration of the mouth of the decanters so as to facilitate pouring in three different directions and to the structure of the pistol-grip handle the structural skeleton of which is integrally connected to the body of the decanter. Further, the invention relates particularly hot beverage decanters having a bottom portion formed of metal to which an upper portion formed of plastic is joined in a leakproof seam or joint.

Decanters or carafes for serving hot coffee, tea, water and other hot beverages are well known. In the past, many such commercial decanters were formed of glass with handles attached by various mechanical arrangements. Such decanters formed with metal bottoms and transparent upper portions have been known and disclosed, for example in U.S. Pat. No. 3,145,708 dated Aug. 25, 1964 and Design Patent No. 259,613 dated June 23, 1981.

The object of the present invention, generally stated, is the provision of decanters for serving hot beverages, particularly hot coffee which incorporate innovations in the configuration or formation of the mouths so as to facilitate pouring by tilting forwardly or to the left or to the right, and to integrally attached skeletal handles to which differently colored handle-completing members may bw attached to form composite serving handles.

An important object of the invention is the provision of decanters for serving hot beverages, particularly hot coffee, wherein at least the upper body portions are formed or plastic to which a pistol-grip skeletal handle is integrally attached and onto the opposite sides of which handle or grip completing members are fastened with the resultant composite handle having openings at the top and bottom for drainage of any liquid that may seep into the handle.

A further object of the invention is the provision of a decanter for serving hot liquids such as coffee having a skeletal handle integrally attached to the body of the decanter with side members attached or secured to opposite sides of the skeletal handle so as to complete its formation with one of the members having a plurality of cylindrical sockets that project through the skeletal handle from one side and the other member having a plurality of pins which project into the sockets and through the skeletal handle from the opposite side with the socket-pin combinations serving as rigidifying members in the composite handle structure.

Certain other objects of the invention will appear from the following detailed description of the preferred embodiment of the invention taken in connection with the accompanying drawings wherein:

FIG. 1 is a side elevational view of a decanter embodying the present invention;

FIG. 2 is a rear elevational view of the decanter shown in FIG. 1;

FIG. 3 is a front elevational view of the decanter shown in FIG. 1;

FIG. 4 is a top plan view of the decanter shown in FIG. 1;

FIG. 5 is a bottom plan view of the decanter shown in FIG. 1;

FIG. 6 is an exploded perspective view showing the components of the decanter shown in FIGS. 1-5;

FIG. 7 is a fragmentary side elevational view of the decanter shown in FIG. 1 with a portion of the body broken away at the joint between the bottom and upper portions of the decanter body and with the integral skeletal handle shown in its bare condition;

FIG. 8 is a fragmentary top plan view with a portion of the composite handle structure broken away;

FIG. 9 is a fragmentary sectional view on enlarged scale taken on line 9—9 of FIG. 1;

FIG. 10 is a fragmentary sectional view on enlarged scale taken on line 10—10 of FIG. 8;

FIG. 11 is an enlarged view taken on line 11-11 of FIG. 1; and

FIG. 12 is an enlarged fragmentary view taken on line 12—12 of FIG. 1.

Referring to FIGS. 1-6, there is indicated therein generally at 5 a decanter for serving hot beverages, particularly coffee. The decanter 5 has a metal bottom portion 6 joined to a plastic upper portion 7 at a circumferential joint or seam 8.

The decanter 5 has a pistol-grip type handle indicated generally at 10 which (referring to FIG. 6) is formed by a skeletal handle 11 integrally molded to the upper plastic portion 7 and left and right hand side members 12 and 13. Preferably, the neck of the plastic upper portion 7 has two spaced circumferential beads 14—14 between which is secured a decorative band 15.

The bottom portion 6 may be formed in known manner from metal, with aluminum or stainless steel being the metals of choice. The upper transparent portion 7 is preferably formed by injection molding in known manner from a suitable heat resistant and durable material such as polysulfone. The bottom of the skirt of the plastic upper portion 7 is formed with a circumferential bead 16 and the rim of the bottom portion 6 is formed with a circumferential vertical collar 17 into which the bead 16 sets. The collar 17 and bead 16 are mechanically worked into a leakproof joint 8 as shown in FIG. 7. The manner of joining the metal bottom portion 6 and plastic upper portion 7 together is known in the art and does not form a part of the present invention.

In use, the decanter 5 will be carried by one hand of the server grasping the handle 10. Generally, the server will tilt the decanter 5 forwardly so that beverage is poured out in a stream at the front portion 20 of the decanter mouth indicated generally at 21. In plan view, the mouth 21 is generally pear-shaped with the front pouring area or weir 20 being at the small end of the pear-shape and with the handle 10 attached at the base or opposite end of the pear-shape. The bulges on opposite sides of the front-to-rear center line of the mouth 21 are shaped so as to provide left and right pouring areas 22 and 23 (FIG. 8). In serving, often there are instances when it is more convenient for the server to pour coffee or other contents from the decanter 5 by tilting to one side rather than by tilting it forwardly. The pouring areas 22 and 23 concentrate the outpouring streams into narrow streams so as to facilitate the pouring of the contents into coffee cups.

A secure and rigid handle 10 constitutes an important component of a decanter for serving hot leverages such as coffee. By having the skeletal handle 11 integrally molded as part of the upper portion 7 and joined to the rear of the decanter neck and also to the shoulder portion of the upper portion 7, a very secure and rigid handle 10 is provided.

The skeletal handle 11 is formed and outlined by an integral band portion 24 which surrounds and is integrally connected to a central web portion 25. The band portion 24 is relatively wide and provides for a substantial area of integral connection of the skeletal handle 11 and upper shoulder portion of the upper portion 7.

As will be apparent from FIG. 6, the handle completing members 12 and 13 fit onto and within the band portion 24 from opposite sides of the web portion 25. The member 13 is provided with a plurality of integrally formed pin-like sockets 26—26 while the member 12 is provided with a plurality of integrally formed pins 27—27. In assembly, the cylindrical sockets 26 project through holes 28—28 provided therefore in the skeletal handle 11 and the pins 27 project snugly into the cylindrical sockets 26. This form of interconnection is shown in FIG. 9 and the interfitting and interlocking sockets 26 and pins 27 provide enhanced rigidity to the structure of the handle 10.

Each of the handle members 12 and 13 is provided with a rectangular shoulder or integral flange 30 and 31, respectively (FIG. 9) which interfits with the adjoining edges 32 and 33, respectively, of the skeletal handle 11. This interfitting arrangement adds further to the rigidity of the handle 10.

It is a current practice to color-code decanters for hot coffee using the color brown to designate "regular" coffee and the color orange to designate "de-caffinated" coffee. While the upper portion 7 of the decanter 5 will generally be formed of clear plastic so as to be color neutral, the handle side members or inserts 12 and 13 can be readily formed in the colors brown or orange, or any other desired color.

The band 15 is provided for decorative or esthetic value and desirably will be formed of metal such as chrome-finished steel and will have two ears 35—35 (FIGS. 6 and 10) for attachment to the web portion 25 of the skeletal handle 11. To provide this connection, the web portion 25 is provided with two integrally formed pins 36—36 (FIGS. 6, 7 and 10) projecting from opposite sides and over which the apertured ears 35 of the band 15 fit. The ears 35 are held in place over the pins 36 by means of sockets 37—37 integrally formed on the interfaces of the handle side members 12 and 13. The substantially continuous band portion 24 of the skeletal handle 11 is interrupted at 39 (FIG. 7) so as to provide a space or gap therein for the band 15.

The side members 12 and 13 may be either detachably or permanently assembled to the skeletal handle 11. With the pins 27 having a snug or friction fit in the sockets 26, the side members upon being pressed together will remain assembled to the skeletal handle 11 and yet they may be pried off in the event replacement is desired such as to provide a handle 10 in a different color.

When the side members 12 and 13 are formed of a solvent-softenable plastic, such as, the pins 27 and/or 26 may be dipped in a suitable solvent (e.g.) so as to slightly soften these elements. Then after the side members 12 and 13 are assembled to the skeletal handle 11 a permanent bond will form between the pins and sockets preventing disassembly of the composite handle structure.

Since small amounts of liquid e.g. dish water) may seep into the composite handle 11, provision is made for the escape or venting of such trapped liquids. When the decanter 5 is setting in its normal upright position as shown in FIG. 1, trapped liquid can drain through vent notches 40—40 (FIG. 11) and/or vent notches 41—41 (FIG. 12). The notches 40 and 41 are formed in the band portion 24 of the skeletal handle 11 and the open sides thereof are closed by adjacent surfaces of the handle members 12 and 13 so as to leave drain holes communicating with the interior of the composite handle 10.

What is claimed is:

1. In a decanter having at least its upper body formed of plastic and having a multi-part pistol-grip handle integrally formed on one side thereof and a mouth from which the decanter contents are poured when the decanter is tilted by means of said handle, said multi-part pistol-grip handle comprising a skeletal handle integrally secured to said plastic upper body and sandwiched between handle-completing members secured to opposite sides of said skeletal handle; said skeletal handle comprising an internal narrow vertical web formed generally perpendicular to said decanter and a relatively wide substantially continuous band portion providing a portion of the gripping surface of said multi-part pistol-grip handle formed generally perpendicular to and substantially surrounding said relatively narrow vertical internal web which has a plurality of transverse pin-receiving openings therein; said handle-completing members having exterior gripping surfaces which lie on opposite sides of said skeletal handle and in conjunction with said gripping surface of said skeletal handle provide the overall gripping surface of said multipart pistol-grip handle, each of said handle-completing members having an integral transverse flange the outer surface of which mates with the inner surface of said substantially continuous band portion on the adjacent side of said internal web with the free edge of each said flange abutting said internal web and each said handle-completing member having a continuous vertical shoulder surrounding its said transverse flange and abutting the adjacent side of said continuous band portion of said skeletal handle whereby each said handle-completing member has three surfaces which mate with three surfaces of said skeletal handle; one of said handle-completing members having a plurality of socket providing pins which project through and substantially fill said pin-receiving openings and the other handle-completing member having a plurality of pins which project into and are secured in said socket-providing pins; the open side of the space within said transverse flange on each said handle-completing member being closed by the adjacent surface of said internal web and the resulting enclosed space on each side of said multi-part piston-grip handle having drain openings at the proximal and distal ends of said handle; said mouth being formed on a neck formation portion of said upper body, a flexible band embracing said neck and having a pair of parallel ears on the ends of said band with each of said ears having an opening therethrough, said vertical web of said skeletal handle having a pair of ear-retaining pins projecting from opposite sides thereof and extending through said openings in said ears, and each of said handle-completing members having an integral socket formation into which one of said ear-retaining pins projects with the inner face of each said socket formation engaging one of said ears and holding it against said vertical web, and said substantially continuous [transverse] band *portion* on said skeletal handle being interrupted on each side to provide an opening through which said band extends.

2. In the decanter called for in claim 1, said drain openings being formed in said substantially continuous band portion of said skeletal handle.

3. In the decanter of claim 1, said handle-completing member having a color indicative of the kind of beverage to be served therefrom.

4. A decanter for serving beverages comprising an upper body portion joined with a bottom portion, said upper body portion being formed of plastic with a mouth formed through a neck portion generally integrally formed on a top area of said upper body portion and a handle integrally formed with said upper body portion and joined with said top area, three pouring weirs formed on said mouth, a forward weir generally formed opposite said handle and two side weirs spaced between said forward weir and said handle opposite one another, said mouth providing a passage through which beverages, disposed within said decanter, are dispensed when said decanter is inclined forwardly or to either side for pouring; said handle having a top end and a bottom end, said top end being integrally formed with said upper body portion and joined at said top end, said bottom end of said handle freely spaced apart from said upper body portion and said bottom portion, a generally flaredly enlarged portion integrally formed in said top end of said handle attaching said handle to said upper body portion along a corresponding outside surface of said neck portion and extending downwardly along a corresponding outside surface of said upper body portion, said flaredly enlarged portion having a width dimension substantially greater than the width of said handle for providing leverage and stability when pouring beverages from said decanter using one of said two side weirs, and handle-completing member embracing and attached to said handle.

5. A decanter according to claim 4 wherein said handle comprises an internal web formed in a plane generally perpendicular to said decanter and a relatively wide outer band portion integrally formed generally perpendicular to said internal web, said internal web including a plurality of opening therethrough, said outer band portion and said internal web being integrally formed with said upper body portion along said corresponding outside surface of said neck portion and said corresponding outside surface of said upper body portion.

6. A decanter according to claim 4 wherein said handle is formed generally angled away from said upper body portion and said bottom portion for providing a comfortable gripping angle making carrying of said decanter less fatiguing.

7. A decanter according to claim 5 wherein said handle-completing members are formed for facilitating gripping of said handle and are color coded to provide beverage identification, said handle-completing members comprising an integral inner band portion formed generally perpendicular to said internal web and mating with said outer band portion integrally formed in said handle and exterior gripping surfaces formed on and generally curvedly projecting outwardly away from said handle for providing a surface with which to grip said handle and to permit beverage and decanter identification from any angle of view.

8. A decanter according to claim 7 wherein said handle-completing members are removably attached to said handle, one of said handle-completing members having a plurality of pin-like sockets which project through and substantially fill said openings in said internal web and the other handle-completing member having a plurality of pins which project into and are secured by said pin-like sockets, said pins matingly engaging corresponding pin-like sockets for attaching said handle-completing members to said handle of said decanter.

9. A decanter according to claim 4, wherein said flaredly enlarged portion is integrally formed with said upper body portion extending downwardly approximately one third of the distance along a corresponding outside surface of said upper body portion.

* * * * *